United States Patent [19]
Gopin

[11] 3,744,478
[45] July 10, 1973

[54] THERMAL RADIATION SHIELD
[75] Inventor: Albert J. Gopin, Los Angeles, Calif.
[73] Assignee: Hughes Aircraft Company, Culver City, Calif.
[22] Filed: Dec. 20, 1971
[21] Appl. No.: 209,815

[52] U.S. Cl.............. 126/270, 250/108 R, 432/31, 322/2, 250/229, 250/239, 250/238
[51] Int. Cl............................................ F27d 21/00
[58] Field of Search.................. 263/50; 250/108 R, 250/108 WS

[56] References Cited
UNITED STATES PATENTS
3,327,041  6/1967  Clune et al. ........................ 263/50
3,252,692  5/1966  Langa ............................ 250/108 R
3,591,400  7/1971  Palmquist et al. .................... 263/50

*Primary Examiner*—John J. Camby
*Attorney*—W. H. MacAllister, Jr.

[57] ABSTRACT

Radiation shield interiorly of device such as spacecraft interrupts radiation between components on the device receiving radiation and components on the device which are aided by control of radiation environment.

6 Claims, 5 Drawing Figures

PATENTED JUL 10 1973 3,744,478

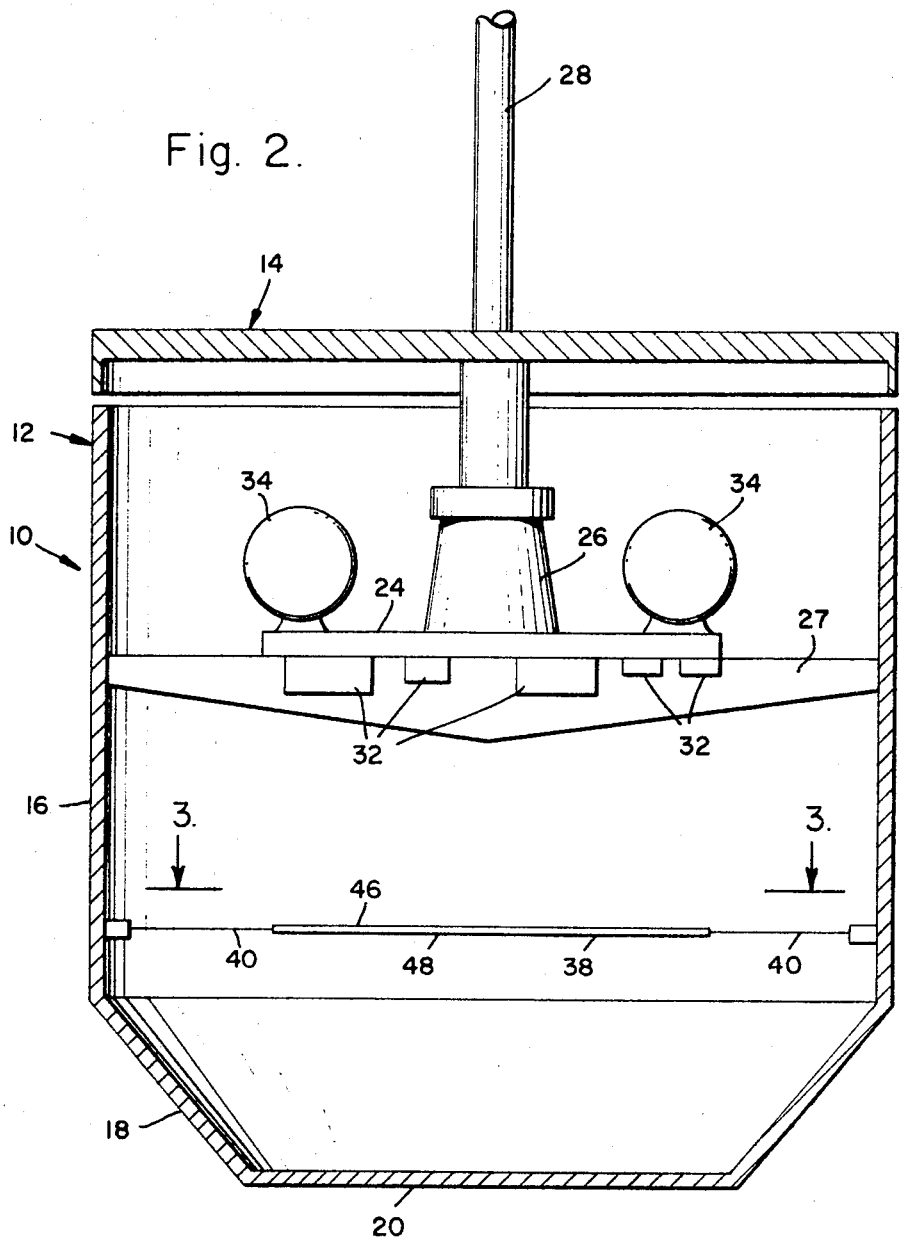

THERMAL RADIATION SHIELD

The invention herein described was made in the course of or under a contract or subcontract thereunder with the U. S. Air Force.

BACKGROUND

This invention is directed to a thermal radiation shield in a device such as a spacecraft positioned between parts of the device receiving direct radiation and parts of the device which would be aided by thermal control.

Most spacecraft employ solar panels which are designed to receive solar radiation for the purpose of employing that radiation for the production of electric power. Current solar cells are fairly inefficient, so that much of the incident solar radiation is received into the spacecraft as heat, rather than as electric energy. Of course, the solar panel surfaces are designed to receive the solar energy, rather than reflect it, so that a considerable heat input to the spacecraft occurs from the solar panels. Some modern spacecraft employ the solar panels around the exterior of the spacecraft body or frame and, thus, the interior environment of the spacecraft is heated by the energy radiated from the back of the solar panels. Components within the spacecraft body receive this radiation. Some such components are adversely affected by this radiation, particularly electronic components which are thermally sensitive. Present temperature control is to mount such thermally-sensitive components upon heat sinks which radiate to space, and thus to dissipate heat, both radiantly and conductively received, as well as heat produced therein as a result of the electrical load. There has been no prior management of radiant energy to such components on a device such as in the interior of the spacecraft.

SUMMARY

In order to aid in the understanding of this invention, it can be stated in essentially summary form that it is directed to a thermal radiation shield in a device, the device receiving external radiation onto a panel and having internal thermally-sensitive components, the improvement comprising a radiation shield placed between the panel and the thermally-sensitive components to control the radiation incident onto the thermally-sensitive components.

It is, accordingly, an object of this invention to provide a thermal radiation shield in a device such as a spacecraft. It is a further object to control the radiation environment of thermally-sensitive components within a device such as a spacecraft. It is yet another object of this invention to provide a radiation shield positioned between a radiation source and a thermally-sensitive component within a device such as a spacecraft. It is another object to provide a thermal radiation shield arranged so that thermally-sensitive components within a device such as a spacecraft have an increased temperature independence of the solar radiation incidence angle. It is yet another object to provide a thermal control device for thermally-sensitive equipment in a device such as a spacecraft which is of minimum weight and high reliability.

Other objects and advantages of this invention will become apparent from a study of the following portion of the specification, the claims, and the attached drawings.

BRIEF DESCRIPTION OF THE DRAWINGS

FIG. 2 is an enlarged longitudinal section, with parts broken away, taken generally along the line 2—2 of FIG. 1.

DESCRIPTION OF THE PREFERRED EMBODIMENT

Figure 1:
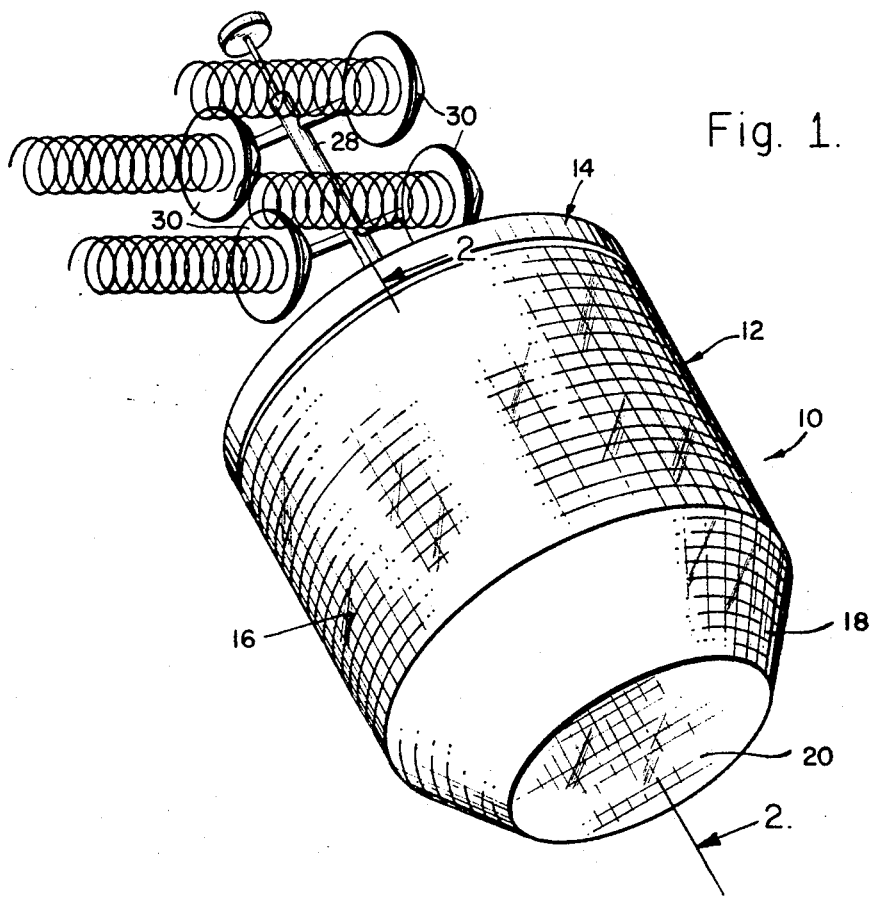
FIG. 1 is a perspective view of a spacecraft device having a thermal radiation shield therein, in accordance with this invention.

FIG. 1 shows a device 10 which is subject to radiation, particularly solar radiation. The device 10 can be any one of a number of different devices subject to such radiation. For example, as shown in FIGS. 1 and 2, device 10 comprises a spacecraft having a spinning body 12 and a despun body 14.

The spinning body 12 has solar cells over a portion of the surface thereof, and preferably over the entire surface thereof which, for appreciable times during the life of the spacecraft, are subject to radiation. In the particular embodiment illustrated, the main portion of spinning body 12 is externally defined by cylindrically-configured configured solar cell panel 16. The lower end of spinning body 12 is terminated in frusto-conically-configured solar cell panel 18 and a substantially planar bottom solar cell panel 20. Internally, the spinning body 12 has a structural crossbrace 27, of which there may be a plurality for adequate bracing, on which is secured mounting plate 24. Mounting plate 24 carries, among other things, bearing 26. The upper end of bearing 26 is part of despun body 14. The parts are arranged so that they can rotate with respect to each other upon the axis of the spacecraft. The axis of the spacecraft is defined by the rotative axis of the bearing 26, and is substantially coincident with the central axis of the cylindrical configured solar cell panel 16 and the axis of the frusto-conical solar cell panel. Despun body 14 has a mast 28 upon which is mounted a plurality of antennas 30.

The purpose of the spacecraft illustrated in FIG. 1, which is exemplary of the device 10, is to orbit the earth. For stability of the spacecraft, the spinning body 12 spins upon its axis and provides gyroscopic stability. An appropriate despin, usually accomplished by a motor connected between the relatively rotating structures, is provided for the body 14 and the antennas 30 mounted upon mast 28. The purpose of these antennas is to always point toward the earth. Furthermore, in the orbit plane which is highly inclined with respect to the earth's equatorial plane, for which the spacecraft is designed, the solar radiation angle phi varies from 0° to nearly 90°. It is for this reason that such solar arrays have been arranged in cylindrical, conical, and flat panels.

Alternatively to the device 10 being the spacecraft illustrated, it can be a spacecraft which is a purely spinning device without any despun portion. All that is required is that there be solar panels and structure secured to the device which require control of radiation thereto. Non-space devices include solar cell arrays with power conditioning equipment secured thereto behind the arrays and subject to different radiation from the arrays. The device 10 also includes the spacecraft type devices described, when they are in a test stage in a test environment on the ground. Spacecraft type devices and mockups thereof are used to test the solar panels, the power conditioning equipment, communications equipment, stability testing and the like in an earthbound test environment.

Figure 5:
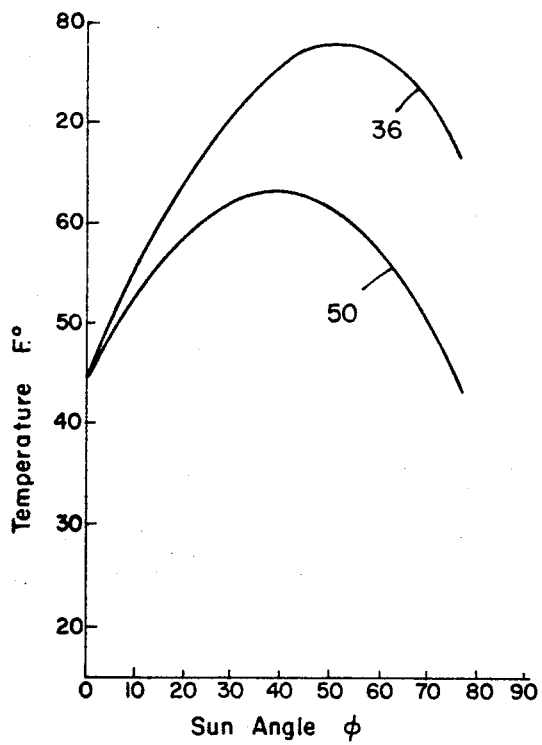
FIG. 5 is a graph showing temperatures experienced with and without employment of the thermal radiation shield.
Figure 4:
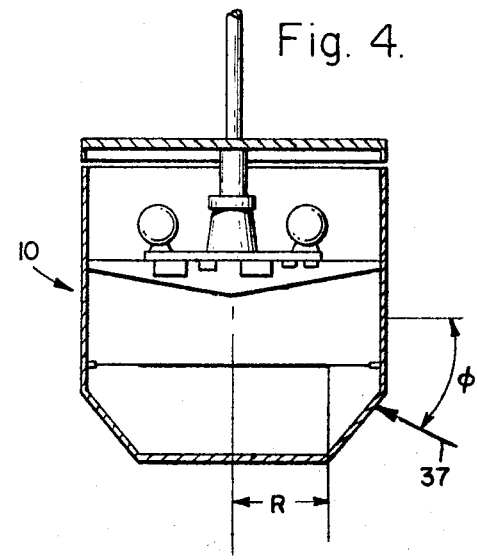
FIG. 4 is a schematic view of reduced size similar to FIG. 2, showing certain dimensions.

Modern solar cell arrays or solar panels have a fairly low efficiency. Of the radiance received in the solar spectrum, only about 8 percent is converted to electrical energy. The balance of the power is reradiated, both from the front and the back of each cell in the solar panel. Thus, there is a considerable amount of internal heating radiation within a device 10 substantially enclosed with solar panels, such as the spacecraft illustrated. Components 32 are mounted upon the underside of mounting plate 24 to receive direct radiation from the backside of many of the solar cells in the panels. Components 34 are mounted on the other side of plate 24. The backs of the solar cells in the panels radiate toward the components, particularly components 32. FIG. 5, by curve 36, illustrates the temperature of the components 32 as a function of sun angle phi, which represents the direction of solar radiation flux vector 37. It is seen that there is a wide temperature excursion, with a peak temperature at a sun angle somewhat above 45°. This indicates that the radiance from the back of panels 18 and 20 to the components 32 increases more than the radiance from the panels 16 thereto decreases, as the sun angle goes above 45°.

Figure 3:
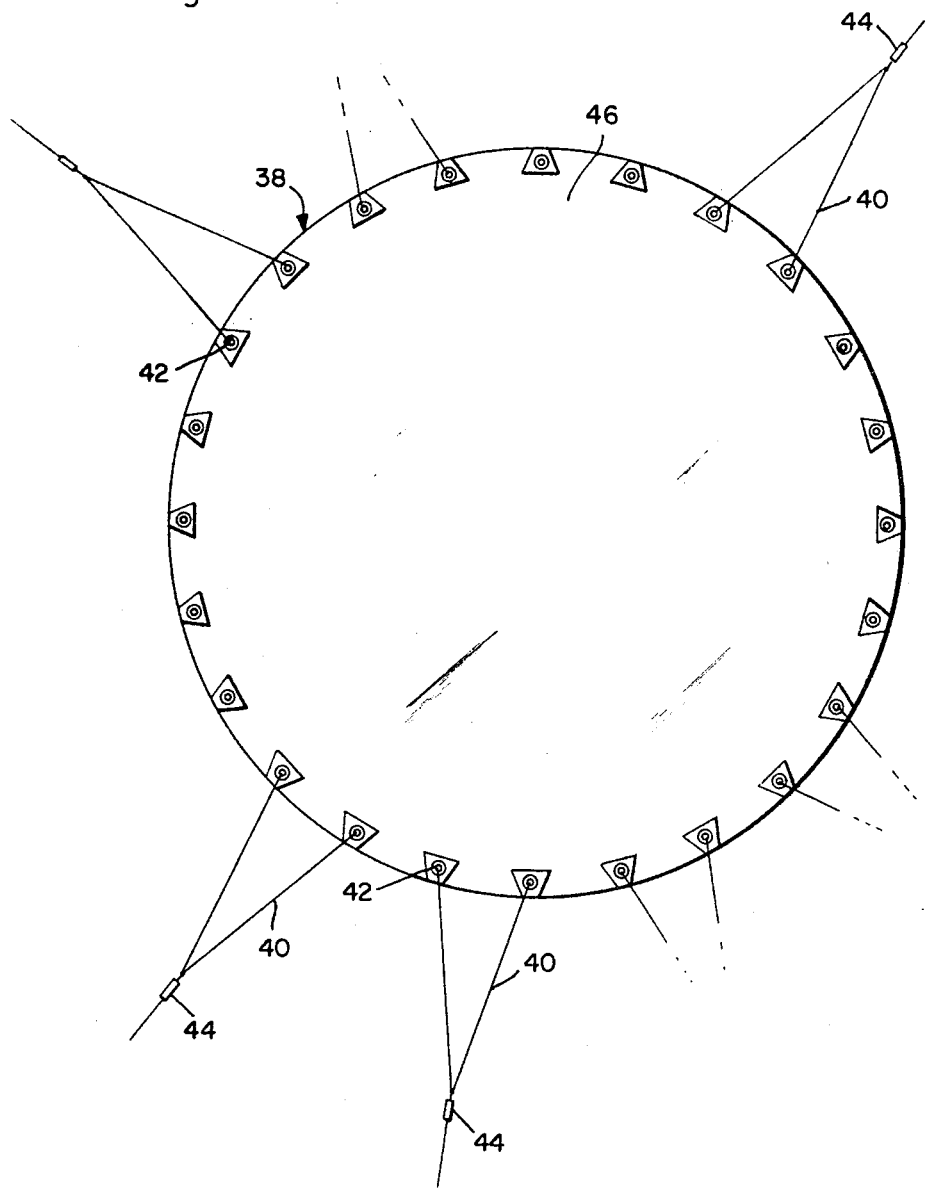
FIG. 3 is a further enlarged section taken generally along the line 3—3 of FIG. 2, showing the thermal radiation shield of this invention in plan view.

The thermal radiation shield of this invention is generally indicated by the numeral 38. FIG. 3 illustrates the shield 38 as being a circular device, supported within the hollow interior of spinning body 12 on cords 40. The edge of the shield 38 has spaced grommets 42 therein, with reinforcing at the grommets. The cords 40 engage in the grommets and engage the structure of spinning body 12 to maintain the shield 38 in place. The support of the shield is preferably resilient, as by springs 44 engaging the cords and the structure of the spinning body to maintain a tension upon shield 38.

The shield 38 may be of structure which is fairly light, such as mylar film suitably treated to provide the radiant flux absorption and emissivity. Size, positioning, and finishes on the thermal radiation shield accomplish a reapportioning of the thermal radiation interchange factors between the interior of the solar panels and the structure within the spacecraft. Referring to FIG. 2, the shield 38 has an upper surface 46 and a lower surface 48. These directions are assigned only for the purpose of reference and have no relationship to the orientation of the structure with respect to the ground. The surfaces 46 and 48 may be finished to have the same emissivity, or may be different. The emissivity may range from a minimum of about 0.05 to a maximum of about 0.85. The surfaces should be of such nature as to achieve diffuse reflection. Where the shield 38 is of mylar, the surface can be aluminized and then fine-sandblasted to achieve the low emittance and the diffuse reflection. For higher values of the emittance, the various following surfaces can be used.

Different emittance values are achieved by using different surface finishes. Ordinary flat black paint has an emittance of 0.85. Bare Kapton or mylar polyester film has an emittance of about 0.7. Aluminum foil has an emittance of about 0.1, while aluminized synthetic polymer composition film has an emittance of about 0.05. Fine sandblasting does not change emittance, but reduces specular reflection and enhances diffuse radiation. Intermediate values of emittance can be obtained by employing patterned areas such as stripes, dots, or checkerboard of surfaces of different emittance. The preferred surface has an emittance of 0.3 on the upper surface 46 and of 0.7 on the lower surface 48. It is achieved by using Kapton or mylar bare polyester film on the lower surface and a checkerboard pattern of about 40 percent area painted flat black over a sandblasted aluminized surface.

The size and positioning of the shield 38 is such that it obstructs all direct line-of-sight between the planar bottom solar cell panel 20 and the components 22 mounted upon mounting plate 24. By this means, all direct radiation from planar panel 20 to the components 32 is obstructed. Radiation is reradiated in diffuse manner by the diffuse surfaces of the shield. Thus, the radius R on the circular shield 38 is substantially equal to the radius of the planar bottom solar cell panel 20. Referring to FIG. 5, the employment of the preferred shield 38, indicated above, results in a temperature of the components 32 versus sun angle curve 50. The temperature excursion is minimized.

The device 10 has a hollow interior in which the shield 38 is located. As discussed, the shield is positioned so that the direct line-of-sight from the planar bottom solar cell panel 20 to the components 32 is obstructed. This does not mean that the radiant energy does not reach the components, because the radiation from the back of the panel 20 reaches shield 38 and part is absorbed. The part that is absorbed is partly reradiated from the upper surface 46. However, as discussed, the upper surface 46 is such that radiation is diffuse so that a lesser portion of the radiation reaches the components 32. The planar bottom solar cell panel 20 is the panel which principally requires control of radiation in the particular device shown in FIGS. 1 and 2 and, thus is considered the first panel.

The second panel comprises the cylindrically-configured solar cell panel 16, and particularly the portion thereof positioned above shield 38 and below mounting plate 24. This portion of the cylindrically-configured solar cell panel is referred to as the second panel and radiates both to the components 32 and to the upper side 46 of shield 38. Of course, the direct radiation from this portion of panel 16 to the components 32 causes some heating thereof. In addition, the portion radiated to the upper side 46 of the shield 38 reradiates in a diffuse manner to also add thermal energy to the components 32.

It is clear that the shield 38 may be employed in any type of device which is subject to solar radiation for the control of interchange of radiant energy within the device.

This invention having been described in its referred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A thermal radiation shield for a device;

a first radiation-receiving panel and a component on said device, said device having a hollow interior between said first radiation-receiving panel and said component, the improvement comprising:

said thermal radiation shield being positioned within the hollow interior of said device between said first radiation-receiving panel and said component so that there is no uninterrupted radiant line-of-sight between said first panel and said component, said shield comprising a thin flexible shield layer, support means resiliently inter-engaging between said shield adjacent its edges and said device for resiliently supporting said shield layer, said radiation shield having a first side and having a diffuse surface on said first side, said first side being directed toward said component so that radiation from said panel to said shield radiates diffusely from said first side of said shield toward said component.

2. The shield of claim 1 wherein said device has a second panel in addition to said first panel, said second panel being positioned to radiate toward said component and toward said shield so that radiation from said second panel toward said shield reradiates from said shield.

3. The shield of claim 2 wherein said second panel at least partly radiates to said first side of said shield.

4. A thermal radiation shield for a device, said device having a first radiation-receiving panel and a component on said device, said device having a hollow interior between said first radiation-receiving panel and said component, the inprovement comprising:

said shield comprising a thin flexible shield layer of flexible synthetic polymer composition material coated at least partly on its first side with a metallic layer having a diffuse surface, said shield being supported within the hollow interior of said device by means of cords engaged in grommets in the edge of said shield layer and resiliently engaged with said device, said shield layer being positioned between said first radiation-receiving panel and said component so that there is no uninterrupted radiant line-of-sight between said first panel and said component, said first side of said shield layer being directed toward said component so that radiation from said panel to said shield radiates diffusely from said first side of said shield layer toward said component.

5. The shield of claim 4 wherein said device has a second panel in addition to said first panel, said second panel being positioned to radiate toward said component and toward said shield so that radiation from said second panel toward said shield reradiates from said shield.

6. The shield of claim 5 wherein said second panel at least partly radiates to said first side of said shield.

* * * * *